Aug. 1, 1933.   W. B. THURMAN ET AL   1,920,720
METHOD OF APPLYING RETREAD RUBBER TO TIRES
Filed June 8, 1931
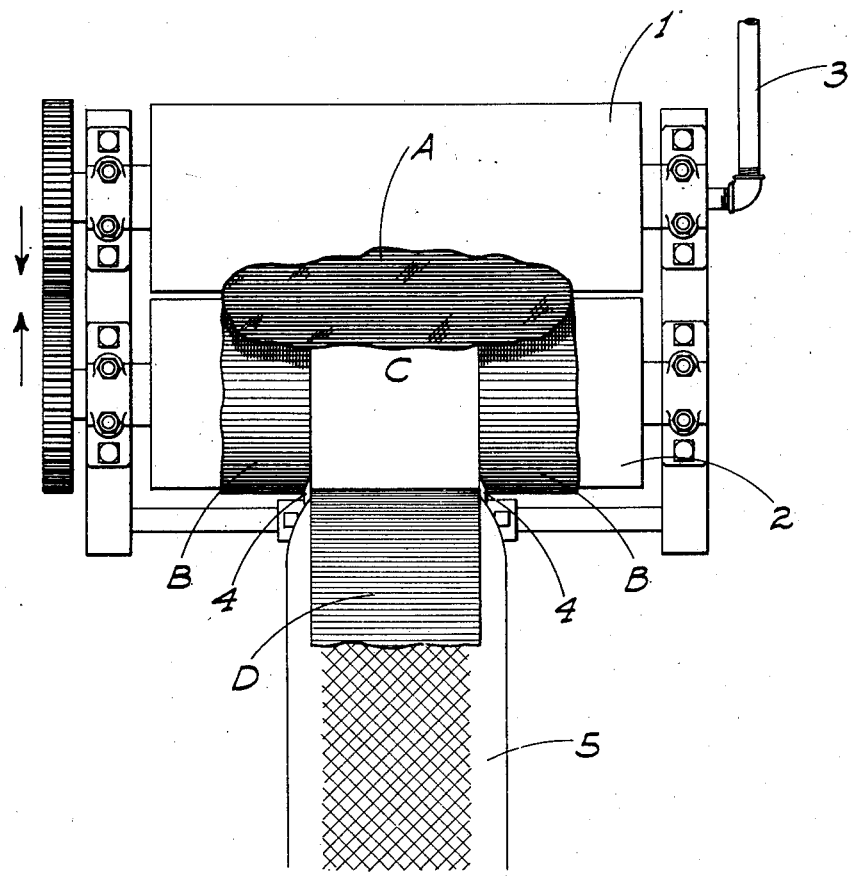
INVENTORS
W^m B. Thurman and H. J. Woock
BY
ATTORNEY Patented Aug. 1, 1933

1,920,720

UNITED STATES PATENT OFFICE 1,920,720

METHOD OF APPLYING RETREAD RUBBER TO TIRES

William B. Thurman and Herbert J. Woock, Lodi, Calif., assignors to Super Mold Corporation Application June 8, 1931. Serial No. 542,994

3 Claims. (Cl. 154—14)

This invention relates to the application of tread rubber to a tire carcass, particularly in shops in which tire retreading operations are carried on.

At present the rubber which is to be vulcanized onto the carcass of the tire is in the form of an already prepared and pre-formed strip which is known in the industry as camelback. This camelback is disposed about the tire carcass prior to the latter being placed in the vulcanizing mold, and it is necessary to apply cement between the camelback and the carcass to assure the necessary adhesion of the new tread carcass.

Since camelback is preformed it must be made up in various lengths, widths and thicknesses, in order to conform to the requirements of tires of different sizes and types. This fact works a considerable hardship on the average tire retreading shop. Since such shops must be prepared to retread a tire of any size, it is necessary that they carry a stock of all sizes of the camelback. This in itself of course ties up considerable capital. Furthermore, the camelback ages if not used and a certain amount of deterioration sets in.

After a certain length of time the sulphur in the rubber moves to the surface in the form of what is referred to in the vernacular of the trade as a bloom. When the camelback is to be used if this bloom is not removed from the surface to be adhered to the carcass of the tire the vulcanizing action is seriously interfered with and often a failure to obtain a proper union between the camelback and the carscass is encountered.

It is therefore one of the objects of our invention to eliminate the expense and trouble incident to the use of this ready made and preformed camelback by providing for the application of bulk rubber directly onto the tire when it is ready to be retreaded.

Bulk rubber is unformed raw rubber which has been milled and compounded with a vulcanizing agent and is a standard form of rubber prepared by manufacturers for vulcanizing purposes.

In lieu of the former practice of using the camelback we aim to make use of the unformed bulk rubber and provide a method and means whereby the same may be applied directly to the tire carcass in such a manner that it will have the necessary adhesion thereto without the necessity of adding cement between the rubber and carcass before vulcanizing as is the present practice.

In connection with our method, we will probably employ an apparatus by means of which the preparation of the bulk rubber and placement thereof on the tire carcass is facilitated. The figure in the accompanying drawing is a more or less diagrammatic elevation showing one possible form of such apparatus as it would appear in operation.

Referring now more particularly to the characters of reference on the drawing, the numerals 1 and 2 designate a pair of horizontal rubber milling rolls driven in any suitable manner. At least one of the rollers is heated by steam pipe 3 or other suitable means.

A pair of spaced cutters 4 engage one roll and are adjustable in any suitable manner so that they may be set to cut strips of rubber of different widths to fit different sizes of tires as will presently appear.

The bulk rubber when cold has practically no tackiness or adhesive characteristics but when heated it becomes quite tacky. In carrying out our method therefore a quantity of the bulk rubber is placed between the rollers 1 and 2 as at A. The action of the rolls mills the rubber therebetween and it is caused to adhere over the surface of one roll in a thin film B. The heat from one of the rolls heats the rubber which then develops its tacky characteristic.

The old rubber is removed from the tire carcass which is to be retreaded, leaving the fabric mesh exposed. When the rubber milling through the rolls has become sufficiently tacky the prepared carcass 5 is pressed against the portion C of one of the rolls between the cutters 4 which have been adjusted to cut a strip of rubber D of the right width to conform to the width of rubber desired to be applied to the carcass 5. The carcass is rotated in time with the rotation of the roll and in an opposite direction. The mesh of the fabric on the tire together with the tackiness of the rubber causes the cut strip to adhere to the carcass and to be withdrawn from the roll. The milling of the bulk of the rubber through the rolls continually forms a new film over the surface of the roll to replace the withdrawn strip so that the strip of rubber may be built up on the carcass to the desired thickness. When this is accomplished the tire is placed in a mold and the rubber vulcanized in place and with desired design according to usual practice.

We have found that the tackiness of the heated rubber provides the necessary adhesion between the rubber and carcass to hold the rubber to the carcass when vulcanized without the necessity of adding cement therebetween.

It will be apparent that in the use of our improved method of applying rubber to tire carcasses for retreading purposes we avoid the expense and trouble entailed in connection with the use of preformed rubber elements such as camelback. We also can apply the rubber much more quickly by reason of avoiding the use of cement. We are also sure that the applied rubber is in the best of condition since the milling of the same through the rolls thoroughly mixes the compounded elements in proper relationship for effective vulcanization.

Our method requires the operator to keep only a stock of the standard bulk rubber on hand and he can apply the same to the tire to be retreaded in any quantity, thickness, and length at any time he may need it and get just as good, if not a better, renewed tread on the tire as he can with the use of camelback.

We have found that the method of adhering the bulk rubber may be somewhat facilitated by preheating the tire carcass before starting the strip of rubber thereon from off of the milling roll.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. The method of applying bulk rubber to a tire carcass comprising heating the carcass and then applying the rubber onto the carcass.

2. The method of applying bulk rubber to a tire carcass comprising heating the rubber, heating the carcass and then applying the heated rubber onto the heated carcass.

3. The method of applying retreading rubber to tires including removing the old rubber on the tire to expose the fabric mesh of the carcass, heating the carcass and then pressing heated unvulcanized rubber into the exposed mesh, such rubber being then built up to a thickness desired for the tread of the tire.

WILLIAM B. THURMAN.
HERBERT J. WOOCK.